United States Patent [19]

Noguchi et al.

[11] Patent Number: 4,688,053
[45] Date of Patent: Aug. 18, 1987

[54] LIQUID JET RECORDING HEAD HAVING A LAYER OF A RESIN COMPOSITION CURABLE WITH AN ACTIVE ENERGY RAY

[75] Inventors: Hiromichi Noguchi, Atsugi; Tadayoshi Inamoto, Machida; Megumi Munakata, Atsugi, all of Japan

[73] Assignee: Canon Kabushiki Kaisha, Tokyo, Japan

[21] Appl. No.: 883,155

[22] Filed: Jul. 8, 1986

[30] Foreign Application Priority Data

Jul. 13, 1985 [JP] Japan ................................. 60-153357
Jul. 13, 1985 [JP] Japan ................................. 60-153361

[51] Int. Cl.$^4$ ............................................. G01D 15/18
[52] U.S. Cl. ................................. 346/140 R; 522/95; 522/102; 522/121; 522/149; 156/668; 430/281
[58] Field of Search ................... 346/140; 522/95, 102, 522/121, 129, 166, 170, 149; 156/668; 430/281

[56] References Cited

U.S. PATENT DOCUMENTS 4,412,224 10/1983 Sugitani ........................ 346/140 X
4,509,063 4/1985 Sugitani .......................... 346/140
4,521,787 6/1985 Yokota ............................. 346/140

Primary Examiner—Joseph W. Hartary
Attorney, Agent, or Firm—Fitzpatrick, Cella, Harper & Scinto

[57] ABSTRACT

A liquid jet recording head having a liquid passage communicated to a liquid discharging outlet provided on a substrate surface is obtained, said passage being formed by subjecting a layer of a resin composition curable with an active energy ray to a predetermined pattern exposure with the use of said active energy ray to thereby form a cured region of said resin composition and removing the uncured region from said layer, said resin composition comprising:

(i) a linear polymer having a glass transition temperature of 50° C. or higher and a weight average molecular weight of about $3.0 \times 10^4$ or higher;
(ii) a monomer having an ethylenically unsaturated bond;
(iii) an epoxy resin comprising at least one compound having one or more epoxy groups in the molecule; and
(iv) a polymerization initiator capable of generating a Lewis acid by irradiation with an active energy ray.

7 Claims, 10 Drawing Figures

LIQUID JET RECORDING HEAD HAVING A LAYER OF A RESIN COMPOSITION CURABLE WITH AN ACTIVE ENERGY RAY

BACKGROUND OF THE INVENTION

1. Field of the Invention

This invention relates to a liquid jet recording head, and more particularly to a recording head for generation of small droplets of a liquid for recording to be used in a liquid jet recording system in which recording is performed by generating small droplets of a liquid for recording such as ink, etc., and attaching them onto a recording medium such as paper.

2. Related Background Art

The liquid jet recording system which performs recording by generating small droplets of a liquid for recording such as ink, etc., and attaching them onto a recording medium such as paper is attracting attention as a recording system which generates very little noise during recording, enables high speed recording and requires no special treatment such as fixing to perform recording on a plain paper, and thus various types of this system have been actively studied.

The recording head portion of the recording device to be used in the liquid jet recording system generally consists of an orifice for discharging a liquid for recording (liquid discharging outlet), a liquid passage connected to said orifice and having a portion at which energy for discharging a recording liquid acts on the recording liquid and a liquid chamber for storing a recording liquid to be fed into said liquid passage.

The energy for discharging the recording liquid during recording is generated in most cases by means of a discharge energy generating element of various types such as heat generating elements, piezoelectric elements, etc. which is arranged at a predetermined position and constitutes a part of the liquid passage where the discharging energy is permitted to act on the recording liquid (energizing portion).

As a method for preparing a liquid jet recording head with such a constitution, there have been known, for example, methods comprising the steps of forming fine grooves on a flat plate of glass, metal, etc. by cutting or etching and then bonding another appropriate plate onto the flat plate having such grooves formed thereon to thereby form liquid passages, or methods comprising the steps of forming groove walls of a cured photosensitive resin by photolithography on a substrate having a discharging energy generating element arranged thereon to provide grooves for the liquid passages on the substrate and then bonding another flat plate (covering) onto the grooved plate thus formed to thereby form liquid passages (for example, Japanese Laid-open Patent Publication No. 43876/1972).

Among these methods for preparation of a liquid jet recording head, the latter group of methods employing a photosensitive resin are more advantageous than the former group of methods since liquid passages can be finely manufactured with higher precision and yield and liquid jet recording heads can be obtained with better quality and lower cost due to mass-producibility.

As a photosensitive resin to be used in preparation of such recording heads, there are employed those to be used for pattern formation in printing plates or print wirings or those known as the photocurable coating materials or adhesives to be used for glass, metal, ceramics, etc. Also, in aspect of work efficiency, dry film type resins have been primarily utilized.

In order to give excellent characteristics such as high recording characteristic, durability, reliability, etc. to a recording head employing a cured film of a photosensitive resin, the photosensitive resin used for the recording head is required to have the characteristics as follows:

(1) particularly, excellent adhesion as a cured film to a substrate;

(2) excellent mechanical strength and durability, etc., when cured; and (3) excellent sensitivity and resolution upon patterning by use of pattern exposure technique.

However, under the present situation, none of the photosensitive resins to be used for formation of a liquid jet recording head hitherto known in the art satisfy all of the above requisite characteristics as mentioned above.

To describe in more detail, those employed for pattern formation in printing plates, print wirings, etc., as a photosensitive resin for recording head, are inferior in adhesion or close contact with glass, ceramics, plastic films, etc. to be used as a substrate although they are excellent in sensitivity and resolution, and insufficient in mechanical strength and durability when cured. For this reason, there is involved the drawback that, at the stage of preparation of recording heads or in the course of usage, deformation, peel-off from the substrate or damages of the resin cured film are liable to occur, which may cause marked impairment of reliability of the recording head such as lowering in recording characteristics by impeding the flow of a liquid for recording in the liquid passages or making the liquid droplet discharging direction unstable.

On the other hand, those which are known as photocurable type coating materials or adhesives to be used for glass, metals, ceramics, etc., although having advantages of excellent close contact or adhesiveness with the substrate composed of these materials as well as satisfactory mechanical strength and durability after cured, are inferior in sensitivity and resolution and therefore require an exposure device of higher intensity or an exposure operation for longer time. Further, their inherent characteristics cannot afford a precise and high density pattern with good resolution, whereby there is involved the problem that it is not suitable for a recording head for which minute precise working is particularly required.

SUMMARY OF THE INVENTION

The present invention has been accomplished in view of the problems as described above and an object of the present invention is to provide a liquid jet recording head having a liquid passage wall comprising a resin cured film satisfying all of the requisite characteristics as mentioned above, which is inexpensive, precise, high in reliability and excellent in durability.

Another object of the present invention is to provide a liquid jet recording head having a constitution of which the liquid passage is minutely worked with good precision and good yield.

It is also another object of the present invention to provide a liquid jet recording head which is high in reliability and excellent in durability even when formed into multi-orifices.

Still another object of the present invention is to provide a liquid jet recording head, having a liquid passage communicated to a liquid discharging outlet provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising the component (i) shown below and at least one of the components (ii) and (iii) shown below and the component (iv) shown below:

(i) a linear polymer having a glass transition temperature of 50° C. or higher and a weight average molecular weight of $3.0 \times 10^4$ or more;

(ii) a monomer having an ethylenically unsaturated bond;

(iii) an epoxy resin comprising at least one compound having one or more epoxy groups in a molecule; and (iv) a polymerization initiator capable of generating a Lewis acid by irradiation with an active energy ray.

DESCRIPTION OF THE PREFERRED EMBODIMENTS

Figure 1A:
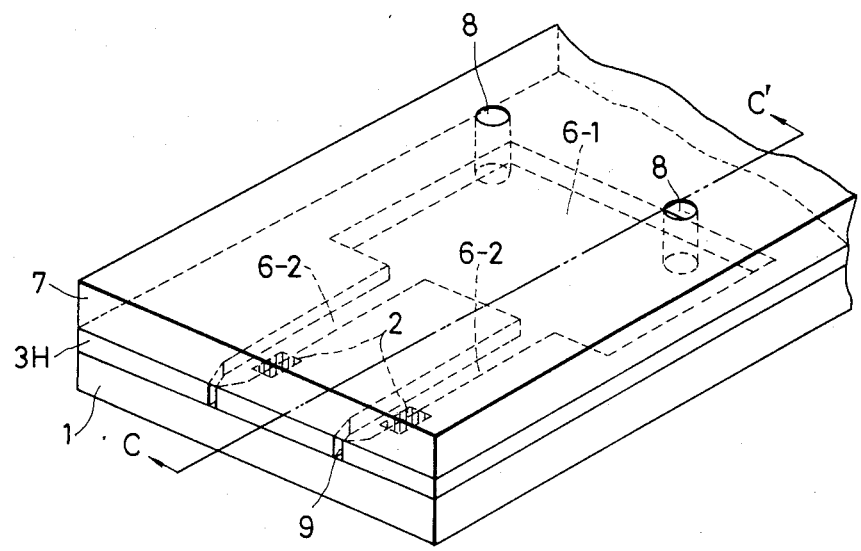
FIGS. 1A to 6B are schematic illustrations for explanation of the liquid jet recording head of the present invention and the methods for producing the same.

Referring now to the drawings, the liquid jet recording head of the present invention is described in detail.

Figure 1B:
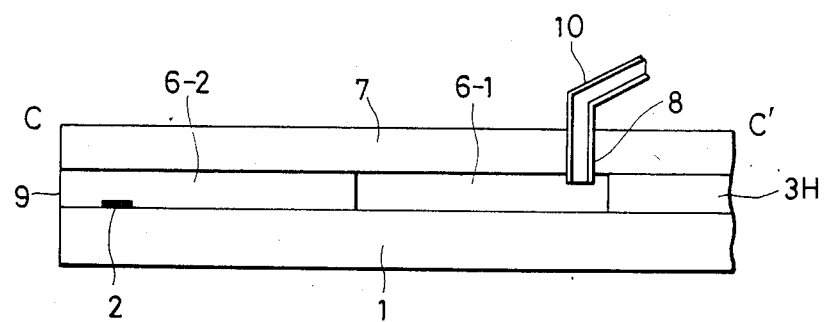

FIG. 1 is an embodiment of the liquid jet recording head of the present invention, FIG. 1A showing a perspective view of the main portion thereof and FIG. 1B showing a sectional view of FIG. 1A cut along the line C—C'.

The liquid jet recording head comprises basically a substrate 1, a resin cured film 3H provided on said substrate 1 and subjected to patterning to a desired shape and a covering 7 laminated on said resin cured film 3H, and these members form orifices 9 for discharging a recording liquid, liquid passages 6-2 communicated to said orifices 9 and having a portion at which an energy for discharging the recording liquid acts on the recording liquid and a liquid chamber 6-1 for storing the recording liquid to be supplied into said liquid passages 6-2. Further, to the thru-hole 8 provided through the covering 7, a pipe 10 for feeding the recording liquid into the liquid chamber 6-1 is bonded from the outside of the recording head. In FIG. 1 (A), the feeding pipe 10 is omitted.

Upon recording, the energy for discharging the recording liquid is generated by applying discharging signals as desired, to discharge energy generating elements 2 of various types such as heat-generating elements, piezoelectric elements, etc. arranged at predetermined positions of the portions for the discharging energy acting on the recording liquid and constituting a part of the liquid passages 6-2, through wirings (not shown) connected to these elements 2.

The substrate 1 constituting the recording head of the present invention is e.g. of glass, ceramics, plastics or metal and the generating elements 2 are arranged in a desired number at predetermined positions. In the embodiment of FIG. 1, two generating elements are provided, but the number and arrangement of the heat generating elements are to be determined depending on the desired constitution of the recording head.

On the other hand, the covering 7 is e.g. of a flat plate of glass, ceramics, plastics or metal and is bonded onto the resin cured film 3H by fusing adhesion or adhesion with the use of an adhesive, and it is also provided with a thru-hole 8 for connection of a feeding pipe 10 at a predetermined position.

In the recording head of the present invention, the resin cured film 3H patterned to a predetermined shape and constituting the liquid passages 6-2 and the liquid chamber 6-1 is obtained by subjecting a layer of a resin composition as described below provided on the substrate 1 or on the covering 7 to patterning according to the photolithographic procedure. Also, said resin cured film 3H may also be subjected to patterning as integrated with the covering made of the same resin composition having the composition as described below.

The resin composition to be used for formation of a resin cured film provided on a substrate for constituting at least the liquid passage is an active energy ray-curing resin composition comprising (i) a linear polymer having a glass transition temperature of 50° C. or higher and a weight average molecular weight of $3.0 \times 10^4$ or more; at least one of (ii) a monomer having an ethylenically unsaturated bond and (iii) an epoxy resin comprising at least one compound having one or more epoxy groups in the molecule; and (iv) a polymerization initiator capable of generating a Lewis acid by irradiation with an active energy ray, and having excellent characteristics as a constituting material for a liquid jet recording head, for example, having a good adhesion property to a substrate made of glass, plastics, ceramics, etc. particularly when formed into a cured film, having a good resistance to a recording liquid such as ink as well as a high mechanical strength and enabling such a patterning as forming a pattern of high precision and resolution with an active energy ray. Further, the resin composition can be used as a dry film, and also in that case, the above excellent characteristics can be exhibited.

The composition of the active energy ray-curing resin composition to be used for formation of the recording head of the present invention is described in detail below.

The active energy ray-curing resin composition to be used in the present invention contains as an essential component (i) a linear polymer having a glass transition temperature of 50° C. or higher and a weight average molecular weight of about $3.0 \times 10^4$ or more in order to give adaptability for maintaining said composition in the form of a solid film when using said composition as, for example, a dry film and also imparting an excellent mechanical strength to a pattern formed by curing.

If the glass transition temperature and the weight average molecular weight of the above linear polymer are lower than the above values, in producing, for example, a dry film, said composition to be formed as a solid resin layer on a substrate of e.g. a plastic film may gradually flow during storage to generate wrinkles or cause variations in layer thickness, whereby a god dry film cannot be obtained.

Within the scope of the examples of such a linear polymer, there may be included thermoplastic copolymers of (A) a monomer, as the main component, of which homopolymer has relatively rigid properties and can give a glass transition temperature as mentioned above and, as a second component for copolymerization contained in an amount of 40 mol% or lower, a monomer selected from (B) hydroxyl containing acrylic monomer, (C) amino or alkylamino containing acrylic monomer, (D) carboxylic containing acrylic or vinyl monomer, (E) N-vinyl-pyrrolidone or its derivatives and (F) vinylpyridine or its derivatives which has a hydrophilic property and can impart excellent adhesiveness to the resin composition to be used in the present invention or (G) a monomer represented by the following formula I which can give high agglomeration strength to the resin composition and can improve mechanical strength of the composition:

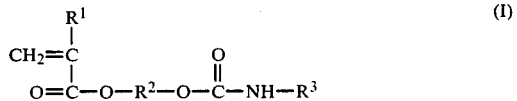

(wherein $R^1$ represents hydrogen or an alkyl group having 1 to 3 carbon atoms, $R^2$ represents a divalent hydrocarbon group which may have internally an ether bond and may be substituted with halogen atoms, and $R^3$ represents an alkyl or phenylalkyl group having 3 to 12 carbon atoms or phenyl group).

Specific examples of the monomer to be used as the component (A) may include alkyl methacrylates having 1 to 4 carbon atoms in the alkyl group thereof such as methyl methacrylate, ethyl methacrylate, isobutyl methacrylate, t-butyl methacrylate and the like, acrylonitrile and styrene. These monomers are preferably contained in an amount of 60 mol % or higher in the linear copolymer in order to impart the above glass transition temperature thereto.

Specific examples of the monomers (B)-(G) to be used as the second component are shown below. Examples of the acrylic monomer (B) containing hydroxyl group include 2-hydroxyethyl (meth)acrylate (hereinafter, (meth)acrylate is intended to include both of acrylate and methacrylate), 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate, 6-hydroxyhexyl (meth)acrylate, and monoester of 1,4-cyclohexanedimethanol with acrylic acid or methacrylic acid; further including those under the trade names of Aronix M5700 (produced by Toa Gosei Kagaku K.K.), TONE M100 (caprolactone acrylate, produced by Union Carbide K.K.), Light Ester HO-mpp (produced by Kyoeisha Yushi Kagaku Kogyo K.K.), Light Ester M-600A (trade name of 2-hydroxy-3-phenoxypropyl acrylate, produced by Kyoeisha Yushi Kagaku Kogyo K.K.), and also monoesters of addition reaction products of divalent alcohols such as 1,10-decanediol, neopentylglycol, bis(2-hydroxyethyl)terephthalate and bisphenol A with ethylene oxide or propylene oxide with (meth)acrylylic acid; and the like.

Examples of the amino or alkylamino containing acrylic monomer (C) include (meth)acrylamide, N,N-dimethylaminoethyl(meth)acrylamide, N,N-dimethyl(meth)acrylamide, N,N-dimethylaminopropyl(meth)acrylamide, N,N-di-t-butylaminoethyl(meth)acrylamide and the like.

Examples of the carboxylic containing acrylic or vinyl monomer (D) include (meth)acrylic acid, fumaric acid, itaconic acid or those known under the trade names of Aronix M-5400, Aronix M-5500, etc., produced by Toa Gosei Kagaku K.K.

Examples of vinylpyridine or its derivatives (F) include 2-vinylpyridine, 4-vinylpyridine, 2-vinyl-6-methylpyridine, 4-vinyl-1-methylpyridine, 2-vinyl-5-ethylpyridine, 4-(4-pipenilinoethyl)pyridine and the like.

The above monomers (B)-(F) all have hydrophilic properties and impart a firm adhesion property to the composition of the present invention when it is adhered to a substrate such as glass, ceramics, plastic, etc.

Specific examples of the monomer (G) represented by the formula I include (α-alkyl)acrylic acid esters having one or more urethane bonds in one molecule obtained by the reaction of (α-alkyl)acrylic acid esters having one hydroxyl group in one molecule with monoisocyanate compounds. $R^2$ in the monomer represented by the formula I can be any divalent hydrocarbon groups which may have internal ether bonds or be substituted with halogen atoms, and preferably $R^2$ is an alkylene group having 2 to 12 carbon atoms which may be substituted with halogen atoms, an alicyclic hydrocarbon group such as 1,4-bismethylenecyclohexane, a hydrocarbon group containing an aromatic ring such as bisphenyldimethylmethane or the like.

Examples of the (meth)acrylic acid esters having at least one hydroxyl group in one molecule to be used for preparation of the monomer represented by the formula I include 2-hydroxyethyl (meth)acrylate, 2-hydroxypropyl (meth)acrylate, 3-chloro-2-hydroxypropyl (meth)acrylate, 4-hydroxybutyl (meth)acrylate, 3-hydroxybutyl (meth)acrylate, 5-hydroxypentyl (meth)acrylate, 6-hydroxyhexyl (meth)acrylate or Light Ester HO-mpp (produced by Kyoeisha Yushi Kagaku Kogyo K.K.), etc. As the (α-alkyl)acrylic acid ester having one hydroxyl group in one molecule, (a) esters of aliphatic or aromatic dihydric alcohols with (meth)acrylic acids and (b) (meth)acrylic acid esters of monoepoxy compounds can be similarly used.

Examples of the dihydric alcohol to be used in the above (a) may include 1,4-cyclohexanedimethanol, 1,10-decanediol, neopentylglycol, bis(2-hydroxyethyl)-terephthalate, addition reaction product of 2 to 10 mols of ethylene oxide or propylene oxide added to bisphenol A. On the other hand, the monoepoxy compounds to be used in the above (b) may include Epolight M-1230 (trade name, produced by Kyoeisha Yushi Kagaku Kogyo K.K.), phenyl glycidyl ether, cresyl glycidyl ether, butyl glycidyl ether, octylene oxide, n-butylphenol glycidyl ether, etc.

As the monoisocyanate compound to be used for preparation of the monomer represented by the formula I, there may be included alkyl monoisocyanates comprising one isocyanate group added to alkyl groups having 3 to 12 carbon atoms, phenyl isocyanate, cresyl monoisocyanate and the like.

The monomer represented by the formula I should be contained in the linear copolymer preferably within the range up to 50 mol %. If the content exceeds 50 mol %, the composition to be obtained will be markedly lowered in softening point, whereby there ensue such problems that the surface hardness of the pattern obtained by curing of said composition may be lowered or that chemical resistance may be deteriorated due to swelling.

The composition to be used in formation of the recording head of the present invention can be used in various forms such as a solution, a solid film, etc., and it is particularly advantageous to use the composition according to the embodiment of a dry film, because it can be handled easily and also the film thickness can be managed easily. Of course, there is no problem in using the composition in the form of a solution.

Having described above mainly about the case of employing a thermoplastic linear polymer, it is also possible to use a linear polymer having heat crosslinkability or photocrosslinkability in the present invention.

A heat crosslinkable linear polymer can be obtained by, for example, introducing to a thermoplastic linear polymer as described above a heat crosslinkable monomer represented by the formula II:

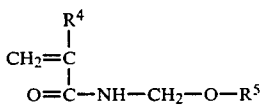  (II)

(wherein $R^4$ represents hydrogen or an alkyl or hydroxyalkyl group having 1 to 3 carbon atoms, and $R^5$ represents hydrogen or an alkyl or acyl group having 1 to 4 carbon atoms which may have hydroxy group) as the second component of copolymerization. The monomer represented by the above formula II is not only heat crosslinkable but also has hydrophilic property; through said heat crosslinkability, excellent properties as construction materials such as heat resistance, chemical resistance or mechanical strength can be exhibited in the resin composition for formation of a resin cured film in the present invention, while excellent adhesion to a substrate can be exhibited through its hydrophilic property.

Examples of the monomer represented by the formula II include N-methylol(meth)acrylamide (the expression (meth)acrylamide is intended to include both of acrylamide and methacrylamide hereinbelow), N-propoxymethyl(meth)acrylamide, N-n-butoxymethyl(meth)-acrylamide, β-hydroxyethoxymethyl(meth)acrylamide, N-ethoxymethyl(meth)acrylamide, N-methoxymethyl(meth)acrylamide, N-acetoxymethyl(meth)acrylamide, α-hydroxymethyl-N-methylolacrylamide, α-hydroxyethyl-N-butoxymethylacrylamide, α-hydroxypropyl-N-propoxymethylacrylamide, α-ethyl-N-methylolacrylamide, α-propyl-N-methylolacrylamide and the like.

These monomers represented by the formula II have hydrophilic property as a matter of course, and also condensing crosslinkability by heating, and will generally form crosslinked bonds by elimination of water molecules or alcohol at a temperature of 100° C. or higher, thereby to form a network structure also in the linear copolymerized polymer itself after curing, whereby the pattern obtained by curing can be further improved in chemical resistance and mechanical strength.

When employing a linear polymer having heat curability, these monomers represented by the formula II should preferably be contained in 5 to 30 mol % in the linear polymer. With a content within the above range, satisfactory chemical resistance based on heat curability can be imparted. In contrast, if the content exceeds 30 mol %, there may occur problems such that the pattern obtained by curing may become brittle.

Other than the monomers represented by the above formula II, monomers which can be crosslinked by ring opening with heat, such as glycidyl (meth)acrylate, etc., can be used suitably as the component for copolymerization, whereby the same effect as in the case of the above formula II can be also obtained.

The photocrosslinkable linear polymer can be obtained by, for example, introducing a photopolymerizable side chain into the linear polymer according to the methods as exemplified below. Such methods may include, for example, (i) the method in which a carboxylic containing monomer typically (meth)acrylic acid, etc., or an amino or tertiary amine containing monomer is copolymerized, followed by the reaction with glycidyl (meth)acrylate, etc.;

(j) the method in which a partial urethane compound of polyisocyanate having one isocyanate group and one or more acrylic ester groups in one molecule is reacted with the hydroxyl group, amino group or carboxyl group in the graft chain;

(k) the method in which acrylic acid chloride is reacted with the hydroxyl groups in the graft chain;

(l) the method in which an acid anhydride is reacted with the hydroxyl group in the graft chain, followed by the reaction with glycidyl(meth)acrylate;

(m) the method in which the hydroxyl group in the graft chain is condensed with the condensing crosslinkable monomer as exemplified in (F), thereby leaving acrylamide group in the side chain;

(n) the method in which the hydroxyl group in the graft chain is reacted with glycidyl(meth)acrylate; etc.

When the linear polymer is heat crosslinkable, it is preferable to perform heating after formation of a pattern by irradiation of an active energy ray. On the other hand, also in the case of a photopolymerizable linear polymer, there is no problem in performing heating within the range permissible in aspect of heat resistance of the substrate, and rather preferable results can be given by heating.

The linear polymers to be used in the resin composition for formation of the resin cured film in the present invention may be classified broadly into those having no curability, those having photocrosslinkability and those having heat crosslinkability as described above. In either case, the linear polymer enables precise patterning by imparting form maintaining property to the subject composition in the curing steps thereof (namely pattern formation by active energy ray irradiation and optional heat curing), and also gives excellent adhesiveness and chemical resistance as well as high mechanical strength to the pattern obtained by curing.

The monomer (ii) having an ethylenically unsaturated bond to be used in the resin composition for formation of the resin cured film in the present invention is a component for permitting the resin composition of the present invention to exhibit curability with an active energy ray, particularly imparting excellent sensitivity to an active energy ray to the resin composition of the present invention, similarly as the epoxy resin (iii) as hereinafter described or together with the epoxy resin (iii). The monomer (ii) should preferably have a boiling point of 100° C. or higher under atmospheric pressure, having preferably two or more ethylenically unsaturated bonds. Various known monomers curable by irradiation of an active energy ray can be usd Specific examples of such monomers having two or more ethylenically unsaturated bonds include (a) acrylic acid esters or methacrylic acid esters of polyfunctional epoxy resins having two or more epoxy groups in one molecule, (b) acrylic acid esters or methacrylic acid esters of alkyleneoxide adducts of polyhydric alcohols, (c) polyester acrylates having acrylic acid ester group at the terminal ends of the molecular chains of polyesters having molecular weights of 500 to 3000 comprising dibasic acid and dihydric alcohol, (d) the reaction products between polyhydric isocyanates and acrylic acid monomers having hydroxyl groups. The above monomers (a)–(d) may be urethanemodified products having urethane bonds in the molecules.

Examples of the monomers belonging to (a) include acrylic acid or methacrylic acid esters of polyfunctional epoxy resins to be used for the epoxy resin component (iii) as hereinafter described.

Examples of the monomers belonging to (b) include ethylene glycol di(meth)acrylate, diethylene glycol di(meth)acrylate, polyethylene glycol di(meth)acrylate, 1,6-hexanediol di(meth)acrylate, pentaerythritol tri(meth)acrylate and the like, and those known under the trade names of KAYARAD HX-220, HX-620, D-310, D-320, D-330, DPHA, R-604, DPCA-20, DPCA-30, DPCA-60, DPCA-120 (all produced by Nippon Kayaku K.K.), and also those known under the trade names of NK Ester BPE-200, BPE-500, BPE-1300, A-BPE-4 (all produced by Shin Nakamura Kagaku K.K.), etc., may also be available.

The monomers belonging to (c) may be exemplified by those known under the trade names of Aronix M-6100, M-6200, M-6250, M-6300, M-6400, M-7100, M-8030, M-8060, M-8100 (all produced by Toa Gosei Kagaku K.K.). Examples of the monomers belonging to (c) and having urethane bonds of polyester include those known under the trade names of Aronix M-1100, Aronix M-1200 (all produced by Toa Gosei Kagaku K.K.).

The monomers belonging to (d) may include the reaction products between polyisocyanates such as tolylene diisocyanate, isophorone diisocyanate, hexamethylene diisocyanate, trimethylhexamethylene diisocyanate, lysine diisocyanate, diphenylmethane diisocyanate and the like with hydroxyl containing acrylic monomers, and it is possible to use the reaction products having (meth)acrylic acid esters containing hydroxyl group added to polyisocyanate compounds known under the trade names of Sumidule N (buret derivative of hexamethylene diisocyanate), Sumidule L (trimethylolpropane-modified product of tolylene diisocyanate) (all produced by Sumitomo Bayer Urethane K.K.), etc. The hydroxyl containing acrylic monomer as herein mentioned may include typically (meth)acrylic acid esters, preferably hydroxyethyl acrylate, hydroxyethyl methacrylate, hydroxypropyl acrylate. It is also possible to use other acrylic monomers containing hydroxyl groups which are mentioned previously as useful for producing the monomer of formula II of the linear polymer.

In addition to the monomers having two or more ethylenically unsaturated bonds as mentioned above, it is also possible to use monomers having only on ethylenically unsaturated bonds as mentioned below together with these monomers. To exemplify such monomers having one ethylenically unsaturated bond, there may be included, for example, carboxylic containing unsaturated monomers such as acrylic acid, methacrylic acid or the like; glycidyl containing unsaturated monomers such as glycidyl acrylate, glycidyl methacrylate or the like; $C_2$–$C_8$ hydroxyalkyl esters of acrylic acid or methacrylic acid such as hydroxyethyl acrylate, hydroxyethyl methacrylate, hydroxypropyl acrylate, hydroxypropyl methacrylate or the like; monoesters of acrylic acid or methacrylic acid with polyethylene glycol or polypropylene glycol such as polyethylene glycol monoacrylate, polyethylene glycol monomethacrylate, polypropylene glycol monoacrylate, polypropylene glycol monomethacrylate or the like; $C_1$–$C_{12}$ alkyl or cycloalkyl esters of acrylic acid or methacrylic acid such as methyl acrylate, ethyl acrylate propyl acrylate, isopropyl acrylate, butyl acrylate, hexyl acrylate, octyl acrylate, lauryl acrylate, cyclohexyl acrylate, methyl methacrylate, ethyl methacrylate, propyl methacrylate, isopropyl methacrylate, butyl methacrylate, hexyl methacrylate, octyl methacrylate, lauryl methacrylate, cyclohexyl methacrylate or the like; other monomers such as styrene, vinyltoluene, methylstyrene, vinyl acetate, vinyl chloride, vinyl isobutyl ether, acrylonitrile, acrylamide, methacrylamide, acrylic acid or methacrylic acid adduct of alkylglycidyl ether, vinylpyrrolidone, dicyclopentenyloxyethyl(meth)acrylate, ε-caploractone-modified hydroxyalkyl(meth)acrylate, tetrahydrofurfulyl acrylate, phenoxyethyl acrylate; and others.

By use of the above monomer (ii) having ethylenically unsaturated bonds, high sensitivity and satisfactory curability to an active energy ray can be imparted to the composition of the present invention.

The epoxy resin (iii) comprising one or more compounds having one or more epoxy groups in one molecule to be used in the resin composition for formation of the resin cured film in the present invention is a component which permits the composition of the present invention to exhibit highly sensitive and satisfactory curability by an active energy ray, alone or together with the monomer (ii) having ethylenically unsaturated bonds as described above, owing to the action of the polymerization initiator (iv) as described hereinafter and, in addition thereto, imparts better adhesiveness to a substrate, water resistance, chemical resistance, dimensional stability, etc., to the cured film of the resin composition of the present invention, when it is formed by coating in liquid state on various substrates comprising glass, plastics, ceramics, etc. followed by curing, or when it is used in the form of a dry film adhered on various substrates.

In the resin composition for formation of the resin cured film in the present invention, any epoxy resin comprising at least one compound containing one or more epoxy groups in one molecule can be used without particular limitation. However, in view of, for example, chemical resistance or mechanical strength of the cured film obtained by curing of the resin composition of the present invention or high durability as a construction material, or in view of workability during formation of various patterns comprising the cured film of said composition on a substrate or resolution of the patterns formed, etc., it is preferable to use an epoxy resin comprising at least one compound containing two or more epoxy groups in one molecule.

Examples of the epoxy resin comprising 2 or more epoxy groups in one molecule include epoxy resins as represented by bisphenol A type, novolac type and alicyclic type, or polyfunctional epoxy resins such as bisphenol S, bisphenol F, tetrahydroxyphenylmethane tetraglycidyl ether, resorcinol diglycidyl ether, glycerine triglycidyl ether, pentaerythritol triglycidyl ether, isocyanuric acid triglycidyl ether, epoxyurethane resins represented by the following formula III:

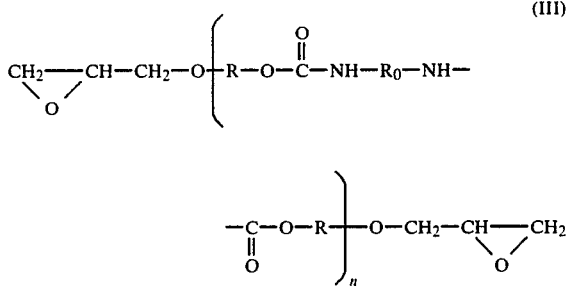

(III)

(wherein R represents an alkyl group or an oxyalkyl group, R₀ represents

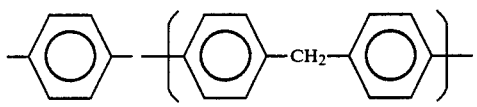

or an alkyl group), etc., and the mixtures of at least one of these.

Specific examples of these polyfunctional epoxy resins include those as mentioned below.

That is, the bisphenol A type epoxy resin may be, for example, Epicoat 828, 834, 871, 1001, 1004 (trade names, produced by Shell Chemical Co.), DER 331-J, 337-J, 661-J, 664-J, 667-J (produced by Dow Chemical Co.) and Epicrone 800 (trade name, produced by Dainippon Ink Kagaku Kogyo K.K.), etc. The novolac type epoxy resin may be, for example, Epicoat 152, 154, 172 (trade names, produced by Shell Chemical Co.), Araldite EPN 1138 (trade name, produced by Ciba Geigy Co.), DER 431, 438 and 439 (trade names, produced by Dow Chemical Co.), etc. The alicyclic epoxy resin may be, for example, Araldite CY-175, -176, -179, -182, -184, -192 (trade names, produced by Ciba Geigy Co.), Chissonox 090, 091, 092, 301, 313 (trade names, produced by Chisso K.K.), CYRACURE 6100, 6110, 6200 and ERL 4090, 4617, 2256, 5411 (trade names, produced by Union Carbide Co.), etc. The polyhydric glycidyl ether of aliphatic polyhydric alcohol may be, for example, ethylene glycol diglycidyl ether, polyethylene glycol diglycidyl ether, propylene glycol diglycidyl ether, polypropylene glycol diglycidyl ether, neopentyl glycol diglycidyl ether, 1,6-hexanediol diglycidyl ether, glycerine diglycidyl ether, trimethylolpropane triglycidyl ether, diglycidyl ether of hydrogenated bisphenol A, 2,2-dibromoneopentyl glycol diglycidyl ether, etc. The polynydric glycidyl ether derived from aromatic polyhydric alcohol may be, for example, diglycidyl ether of an addition product of bisphenol A added with 2 to 16 mols of alkyleneoxide, a diglycidyl ether of an addition product of bisphenol F added with 2 to 16 mols of alkyleneoxide, a diglycidyl ether of an addition product of bisphenol S added with 2 to 16 mols of alkyleneoxide.

On the other hand, examples of the compounds containing one epoxy group in one molecule include olefin oxides, octylene oxide, butyl glycidyl ether, glycidyl methacrylate, allyl glycidyl ether, styrene oxide, phenyl glycidyl ether, n-butylphenol glycidyl ether, 3-pentadecylphenyl glycidyl ether, cyclohexenevinyl monooxide, α-pinene oxide, glycidyl ester of tert-carboxylic acid and mixtures thereof.

These monofunctional epoxy resins can be used together with the polyfunctional epoxy resin as mentioned above or also individually alone.

To the resin composition for formation of the resin cured film in the present invention, the above epoxy resin (iii) provides a highly sensitive and satisfactory curability to an active energy ray owing to the action of a Lewis acid generated by irradiation with an active energy ray of a polymerization initiator (iv) as described below on the epoxy group of the epoxy resin (iii), together with the monomer (ii) having ethylenically unsaturated bonds as described above, thereby enabling precise and high resolution pattern formation upon using the composition of the present invention through said curability as well as imparting good adhesion to a substrate, chemical resistance, dimensional stability, etc., through heat curability possessed inherently by epoxy resins.

The polymerization initiator (iv) capable of generating a Lewis acid by irradiation with an active energy ray to be used in the resin composition of the present invention is a component for curing the epoxy resin (iii) as mentioned above by the action of said Lewis acid, which permits the resin composition of the present invention to exhibit highly sensitive and satisfactory curability by an active energy ray together with the monomer (ii) having ethylenically unsaturated bonds as described above. As such a polymerization initiator (iv), there may be preferably used, for example, aromatic onium salt compounds having photosensitivity containing an element belonging to the group VIa as disclosed in Japanese Patent Publication No. 14278/1977 or aromatic onium salt compounds having photosensitivity containing an element belonging to the group Va as shown in Japanese Patent Publication No. 14279/1977, or aromatic halonium salts having photosensitivity as shown in Japanese Patent Publication No. 14277/1977. These aromatic onium salt compounds or aromatic halonium salts all have the characteristic of curing the epoxy resin (iii) by releasing a Lewis acid by irradiation with an active energy ray.

The aromatic onium salt compounds having photosensitivity of the element belonging to the group VIa or the group Va may include typically the compounds of the following formula IV:

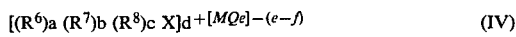

(wherein r⁶ represents a monovalent organic aromatic group, $R^7$ a monovalent organic aliphatic group selected from alkyl groups, cycloalkyl groups and substituted alkyl groups, $R^8$ a polyvalent organic group for constituting heterocyclic or fused ring structure selected from aliphatic groups and aromatic groups, X an element belonging to the VIa group selected from sulfur, selenium and tellurium or an element belonging to the group Va selected from nitrogen, phosphorus, arsenic, antimony and bismuth, M a metal or metalloid and Q a halogen atom, a is an integer of 0 to 3 when X is an element belonging to the group VIa or an integer of 0 to 4 when X is an element belonging to the group Va, b is an integer of 0 to 2, c is an integer of 0 or 1 when X is an element belonging to the group VIa or an integer of 0 to 2 when X is an element belonging to the group Va, f is an integer of 2 to 7 representing the valence of M, e is an integer which is greater than f but not more than 8, and the sum of a, b and c is 3 when X is an element belonging to the group VIa or 4 when X is an element belonging to the group Va, and d = e−f).

On the other hand, the photosensitive aromatic halonium salt may be exemplified by the following formula V:

$$[(R^9)_g(R^{10})_hX]_i^+ [MQ_j]^{-(k-l)} \quad (V)$$

(wherein $R^9$ represents a monovalent aromatic organic group, $R^{10}$ a divalent aromatic organic group, X a halogen group, M a metal or metalloid and Q a halogen group, respectively, g is an integer of 0 or 2 and h is an integer of 0 or 1, with the sum of g and h being equal to the valence of X, i being equal to k−1, l is an integer of 2 to 7 which is equal to the valence of M and k is an integer of up to 8 which is greater than 1).

Specific examples of the photosensitive aromatic onium salt compounds containing an element belonging to the group VIa or the group Va which can be formulated in the resin composition of the present invention may include the photosensitive aromatic onium salts of the elements belonging to the group VIa as shown below:

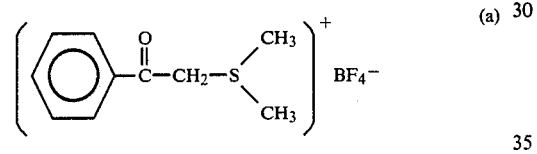
(a)

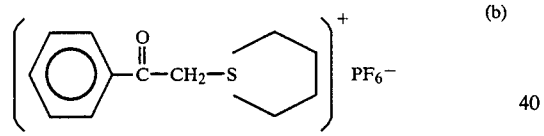
(b)

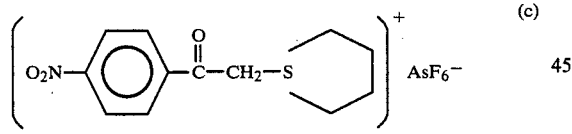
(c)

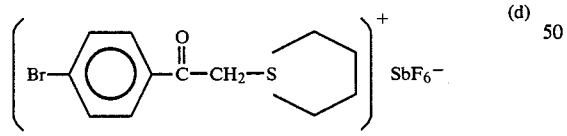
(d)

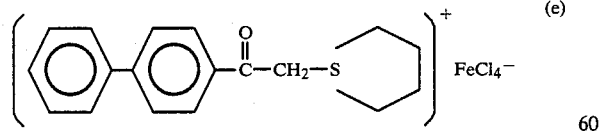
(e)

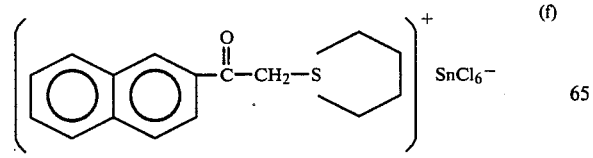
(f)

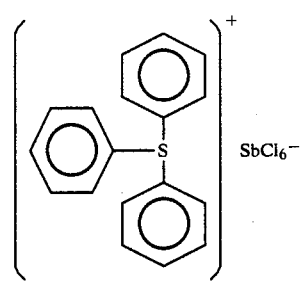
(g)

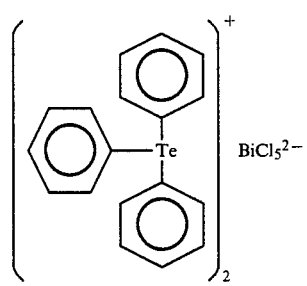
(h)

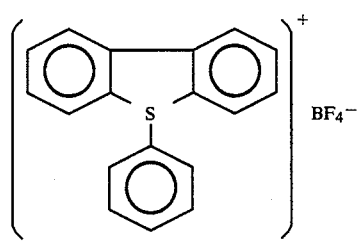
(i)

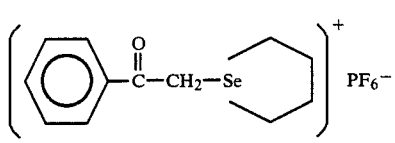
(j)

and photosensitive aromatic onium salts of the elements belonging to the group VA as shown below:

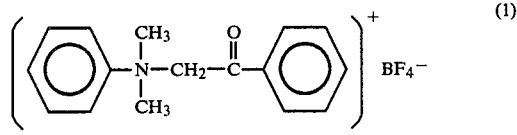
(1)

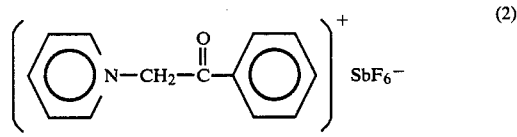
(2)

(3)

-continued (4) 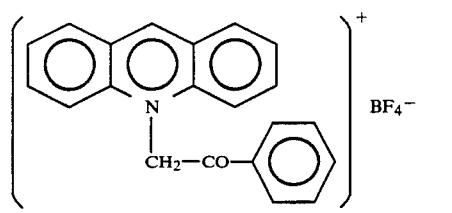

(5) 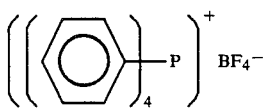

(6) 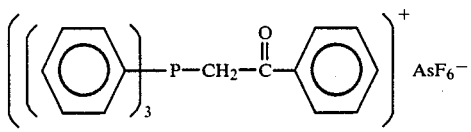

(7) 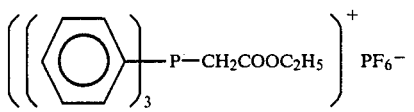

(8) 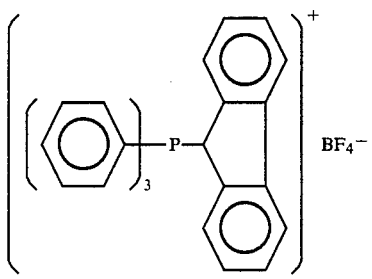

(9) 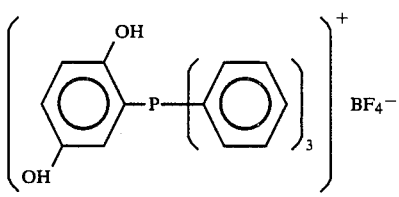

(10) 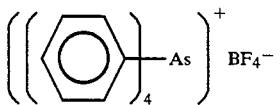

(11) 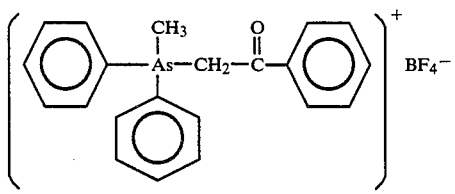

(12) 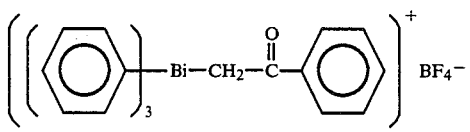

Specific example of the photosensitive aromatic halonium salts include, for example, (A) 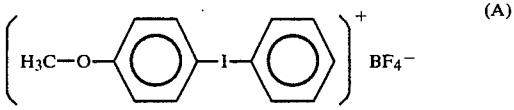

(B) 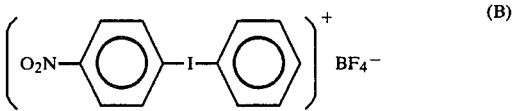

(C) 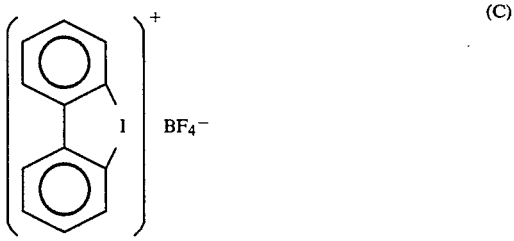

(D) 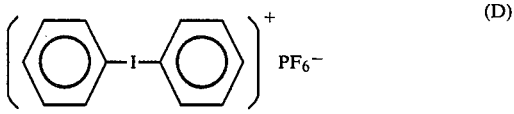

(E) 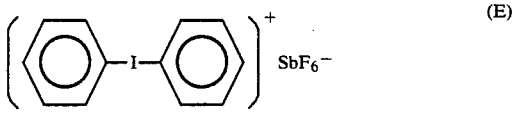

In addition to the polymerization initiator (iv) releasing a Lewis acid as described above, it is also possible to employ, if desired, curing agents generally employed widely as the curing agent for epoxy resins, such as polyamine, polyamide, acid anhydride, boron trifluoride-amine complex, dicyandiamide, imidazoles, complexes of imidazole with metal, etc.

The active energy ray-curing resin composition for formation of the resin cured film in the present invention can be cured by an active energy ray as described above, and a radical polymerization initiator capable of forming organic free radicals which can be activated by the action of an active energy ray may be added in said resin composition, in addition to the polymerization initiator (iv) as herein mentioned, for the purpose of imparting further excellent curability by an active energy ray to the monomer (ii) having ethylenically unsaturated bonds as described above, or when employing a linear polymer (i) having photopolymerizability. Particularly, in the case when employing a linear polymer (i) having photopolymerizability and using an active energy ray with wavelength of 250 nm to 450 nm, it is preferable to use the radical polymerization initiator as mentioned above together with the above polymerization initiator (iv). As the radical polymerization initiator, known substances having the property of being activated with an active energy ray, forming organic free radicals and initiating radial polymerization can be used without any particular limitation.

Specific examples of such radical polymerization initiators include benzyl; benzoin alkyl ethers such as benzoin isobutyl ether, benzoin isopropyl ether, benzoin-n-butyl ether, benzoin ethyl ether, benzoin methyl ether and the like; benzophenones such as benzophenone, 4,4'-bis(N,N-diethylamino)benzophenone, benzophenone methyl ether and the like; anthraquinones such as 2-ethylanthraquinone, 2-t-butylanthraquinone and the like; xanthones such as 2,4-dimethylthioxanthone, 2,4-diisopropylthioxanthone and the like; acetophenones such as 2,2-dimethoxy-2-phenylacetophenone, α,α-dichloro-4-phenoxyacetophenone, p-tert-butyltrichloroacetophenone, p-tert-butyldichloroacetophenone, 2,2-diethoxyacetophenone, p-dimethylaminoacetophenone and the like; or hydroxycyclohexylphenyl ketone (e.g. Irugacure 184, produced by Ciba Geigy Co.), 1-(4-isopropylphenyl)-2-hydroxy-2-methylpropane-1-one (e.g. Darocure 1116, produced by MERCK Co.), 2-hydroxy-2-methyl-1-phenylpropane-1-one (Darocure 1173, produced by MERCK Co.); etc., as preferable ones. In addition to these radical polymerization initiators, amino compounds may be added as the photopolymerization accelerator.

The amino compounds to be used as the photopolymerization accelerator may include ethanolamine, ethyl-4-dimethylaminobenzoate, 2-(dimethylamino)ethylbenzoate, p-dimethylamino benzoic acid n-amylester, p-dimethylaminobenzoic acid isoamylester, etc.

The constitutional ratio of the above materials constituting the active energy ray-curing resin composition for formation of the resin cured film in the present invention may be preferably such that $L/(L+M+E)$ is within the range from 0.2 to 0.8 and $E/(E+M)$ within the range from 0.3 to 0.7, wherein L is the content in parts by weight, for the linear polymer (i), M for the monomer having ethylenically unsaturated bonds (ii) and E for the epoxy resin (iii), and the polymerization initiator (iv) preferably 0.2 to 15 parts by weight per 100 parts by weight of $(L+M+E)$ (in the above formula, either one of M and E may be zero).

If $L/(L+M+E)$ is smaller than 0.2, the content of the linear polymer in the resin composition becomes so small that satisfactory adhesiveness with a substrate based on the graft copolymerized polymer cannot be exhibited, or the drying property of the solvent, when employing a solvent, may be worsened to make the surface of the pattern obtained by curing sticky. On the other hand, if $L/(L+M+E)$ is in excess of 0.8, the content of the monomer having ethylenically unsaturated bonds and of the epoxy resin in the resin composition of the present invention is reduced, whereby sensitivity to the active energy ray may be lowered to retard the curing speed during pattern formation, or some disadvantages may arise such as lower resolution, poor chemical resistance or poor mechanical strength of the pattern formed, etc. If $E/(E+M)$ is smaller than 0.3, the pattern obtained by curing cannot exhibit fully chemical resistance and adhesiveness derived from the epoxy resin. On the other hand, if $E/(E+M)$ exceeds 0.7, high sensitivity and sufficient curability based on the monomer having ethylenically unsaturated bonds cannot be imparted or curing time may be retarded.

When a radical polymerization initiator to be activated by the action of an activation energy ray is used in the resin composition for formation of the resin cured film in the present invention, said polymerization initiator may be added in an amount within the range from 0.1 to 20 parts by weight, preferably from 1 to 10 parts by weight based on 100 parts by weight of the resin components comprising the linear polymer (i), the monomer having ethylenically unsaturated bonds (ii) and the epoxy resin (iii) [(i)+(ii)+(iii)].

As a solvent to be used when employing the active energy ray-curing resin composition of the present invention in the form of a solution or when coating the composition on a plastic film which is a film substrate in formation of a dry film, hydrophilic solvents such as alcohols, glycol ethers, glycol esters, etc., may be employed. Of course, it is also possible to use mixtures comprising these hydrophilic solvents as the main component, mixed optionally at appropriate proportions with ketones such as methyl ethyl ketone, methylisobutyl ketone, etc., esters such as ethyl acetate, isobutyl acetate, etc., aromatic hydrocarbons such as toluene, xylene, etc., and their halogen derivatives, aliphatic solvents containing chlorine such as methylene chloride, 1,1,1-trichloroethane, etc. These solvents can be also used as the developer for the composition of the present invention.

The active energy ray-curing resin composition for formation of the resin cured film in the present invention can further contain, in addition to the above radical polymerization initiator or the solvent as described above, additives such as catalysts for condensation crosslinking, heat polymerization inhibitors, colorants (dyes and pigments), fine particulate fillers, adhesion promotors, plasticizers, etc., if desired.

Condensation crosslinking catalysts may include sulfonic acids, typically p-toluenesulfonic acid, carboxylic acids such as formic acid, etc. Heat polymerization inhibitors may include hydroquinone and derivatives thereof, p-methoxyphenol, phenothiazine, etc. As a colorant there can be added oil-soluble dyes and pigments within the range which do not substantially prevent transmission of the active energy ray. As a filler, for enhancement of hardness of coating, as well as for enhancement of coloration, adhesion or mechanical strength, there may be employed extender pigments, plastic fine particles, etc., which are used in coating materials in general. As an adhesion promotor, silane coupling agents, low molecular surfactants as inorganic surface modifiers may be effectively used in the composition of the present invention.

The resin composition as described above is cured with an active energy ray to form the resin cured film 3H constituting the recording head of the present invention.

Next, referring to an embodiment using a dry film type resin composition for formation of the resin cured film 3H, the method for preparing the liquid jet recording head of the present invention is described in detail with the aid of drawings.

FIGS. 2 to 6 are schematic illustrations showing the preparation procedure of the liquid jet recording head of the present invention.

Figure 2:
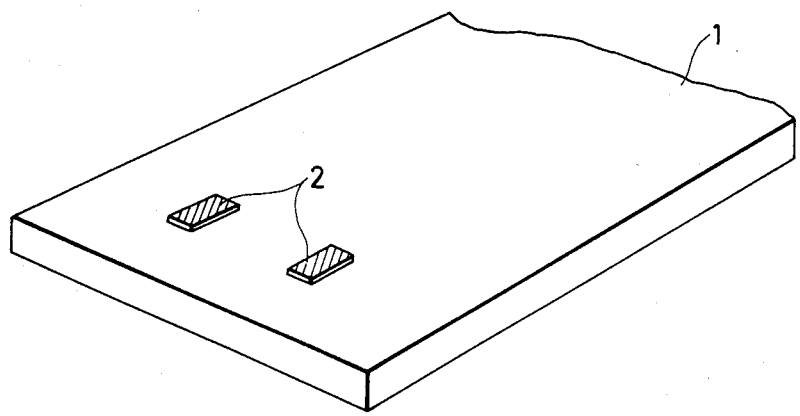

For formation of the liquid jet recording head of the present invention, first, as shown in FIG. 2, a desired number of discharge energy generating elements 2 such as heat generating element or piezoelectric element are arranged on a substrate 1 of glass, ceramics, plastics, metal, etc. If desired, for the purpose of imparting chemical resistance to the recording liquid, electrical insulating property, etc. to the surface of the substrate 1, said surface may be coated with a protective layer of $SiO_2$, $Ta_2O_5$, glass, etc. Also, to the discharge energy generating elements 2 are connected electrodes for inputting recording signals, although not shown in the drawing.

Figure 3A:
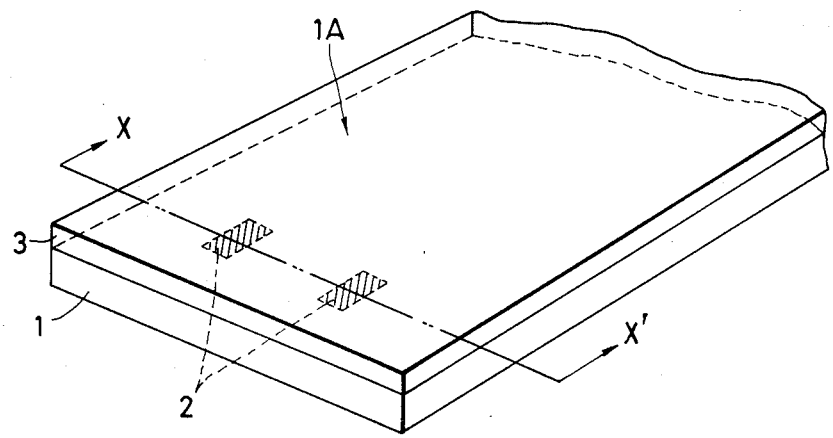
Figure 3B:
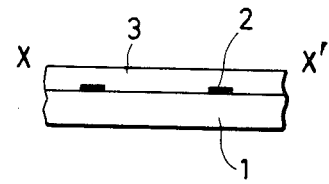

Next, the surface of the substrate 1 obtained after the step shown in FIG. 2 is cleaned and at the same time dried at, for example, 80° to 150° C., and then the active energy ray-curing resin composition 3 as described above of a dry film type (film thickness, about 25 µm to 100 µm), as shown in FIG. 3A and FIG. 3B, is heated to about 40° to 150° C. and laminated on the substrate surface 1A at a speed of, for example, 0.5 to 0.4 f/min. under the pressurizing condition of 1 to 3 Kg/cm$^2$.

Figure 4:
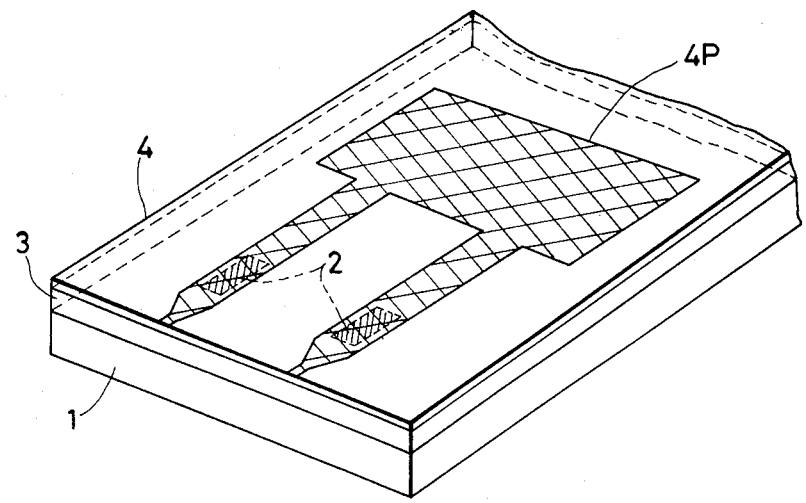

Subsequently, as shown in FIG. 4, on the dry film layer 3 provided on the substrate surface 1A, a photomask 4 having a pattern 4P with a desired shape which does not transmit an active energy ray is superposed, and then exposure is effected from the overhead position of the photomask 4.

Alignment of the photomask 4 with the substrate 1 is performed so that the above element 2 may be positioned in the liquid passage region finally formed after the steps of exposure, development, etc., for example, according to the method in which registration marks are previously given onto both the substrate 1 and the mask 4 and alignment is effected on the basis of the marks.

By carrying out exposure in such a manner, the portion not covered with said pattern, namely the exposed portion of the dry film layer 3 is cured by polymerization and becomes insoluble in a solvent, while the unexposed portion remains soluble in a solvent.

The active energy ray to be used for such a pattern exposure may include UV-rays or electron beams which have widely been practically applied. As a UV-ray light source, there may be employed high pressure mercury lamps, ultra-high pressure mercury lamps, metal halide lamps, etc., enriched in light with wavelength of 250 nm to 450 nm, preferably those which can give a light intensity of about 1 mW/cm$^2$ to 100 mW/cm$^2$ at a wavelength in the vicinity of 365 nm at a distance between the lamp and the material to be irradiated which is practically permissible. The electron beam irradiation device is not particularly limited, but a device having a dose within a range of 0.5 to 20 M Rad is practically suitable.

Figure 5A:
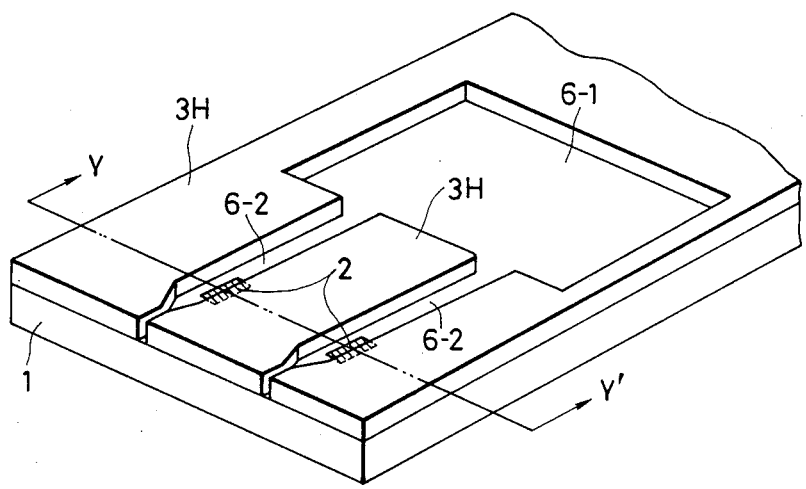
Figure 5B:
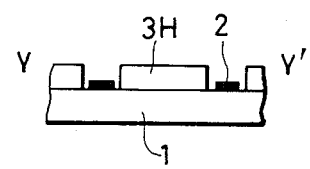

After completion of the pattern exposure of the dry film layer 3, the dry film 3 subjected to exposure is developed by, for example, dipping in a volatile organic solvent such as 1,1,1-trichloroethane, etc., to remove by dissolution the unpolymerized (uncured) portion of the dry film layer 3 which is solvent soluble, thereby forming grooves which will finally become the liquid passages 6-2 and the liquid chamber 6-1 as the cured portion of film 3H is left on the substrate 1 as shown in FIG. 5A and FIG. 5B.

When a heat curable linear polymer is employed, the cured resin film 3H is subjected to heat polymerization, if desired, by heating at a temperature of e.g. 100° C. for about 5 to 10 minutes.

In the recording head of the above embodiment, the grooves for liquid passages 6-2 and liquid chamber 6-1 are formed by using a resin composition of a dry film type, namely a solid composition. However, the active energy ray curing type resin composition which can be used for formation of the recording head of the present invention is not limited to only solid compositions, but also a liquid composition may be available.

As a method for forming a layer of said composition by use of a liquid resin composition on a substrate, there may be employed, for example, the squeegee method to be used in preparation of a relief image, namely the method in which a wall with a height corresponding to the thickness of a desired resin composition film is provided around the substrate and superfluous resin composition is removed by means of a squeegee, etc. In this case, the resin composition may appropriately have a viscosity of 100 cp to 3000 cp. The height of the wall placed around the substrate must be determined in view of the amount reduced by evaporation of the solvent contained in the light-sensitive resin composition.

When a solid resin composition is employed, it is suitable that a dry film is forced to adhere onto the substrate by pressure contact with heating.

However, in forming the recording head of the present invention, a solid film type is convenient for handling and also for easy and correct control of the thickness.

Figure 6A:
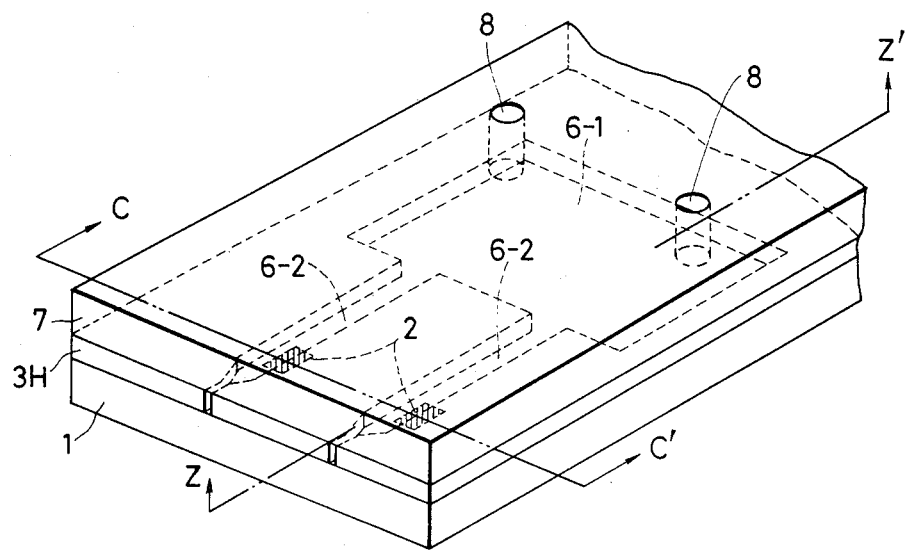
Figure 6B:
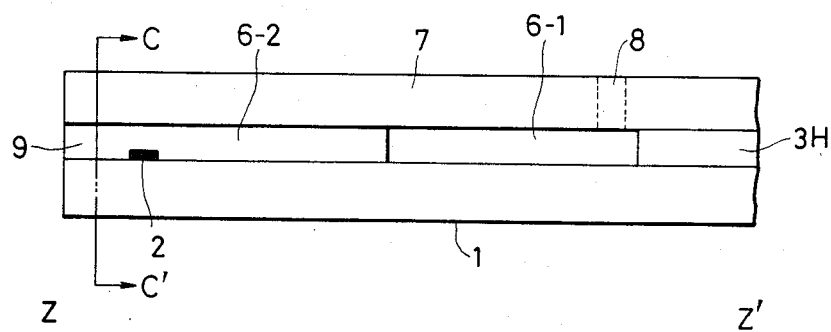

After having thus formed the grooves for constituting finally the liquid passages 6-2 and the liquid chamber 6-1 with the resin cured film 3H, a flat plate 7 which is to be a covering over the grooves is forced to adhere onto the resin cured film 3H to form a bonded body, as shown in FIG. 6A and FIG. 6B.

In the steps shown in FIG. 6A and FIG. 6B, as the specific method for providing the covering 7, for example, after the flat plate of glass, ceramics, metal, plastics, etc., is coated with an epoxy resin type adhesive by spin coating to a thickness of 3 to 4 µm, the adhesive layer is previously heated to effect the so-called B-staging and then allowed to adhere onto the cured dry film 3H, followed by main curing of the above adhesive layer. However, it is also possible to employ a method without using adhesives, for example, allowing a flatplate 7 of a thermoplastic resin such as acrylic resin, ABS resin, polyethylene, etc. to be thermally fused to adhere directly onto the resin cured film 3H.

It is also preferable to use the method in which a resin layer of the resin composition for formation of the resin cured film in the present invention is formed on the covering 7 on the side to be bonded to the liquid passages, then the resin layer is thermally fused to the resin cured film 3H having formed liquid passages thereon and thereafter it is heated and irradiated with an active energy ray, namely the method of using the resin composition for formation of the resin cured film in the present invention as an adhesive.

In FIG. 6, 6-1 shows a liquid chamber, 6-2 a liquid passage and 8 a thru-hole for connecting a pipe (not shown) for feeding the recording liquid to 6-1 from outside of the recording head not shown.

After having completed thus the bonding between the resin cured film 3H provided on the substrate 1 and the flat plate 7, the bonded body is cut along C—C' positioned on the downstream side of the liquid passages 6-2 shown in FIG. 6A and FIG. 6B, thereby forming orifices for discharging the recording liquid which is the opening portion of the liquid passage at the cut surface.

This step is conducted for rendering the distance between the discharge energy generating element 2 and the orifice 9 adequate, and the region to be cut here may be selected suitably. For this cutting, there may be employed the dicing method, etc., which is conventionally employed in semiconductor industries.

The downstream portion of the liquid passage as mentioned in the present invention refers to the region on the downstream side along the flow direction of the recording liquid during recording by use of a recording head, more specifically the portion of the liquid passage downstream of the position where the discharge energy generating element 2 is located.

After cutting, the cut surface is smoothed by polishing and a feeding pipe 10 is attached to the thru-hole 8 to complete a liquid jet recording head as shown in FIG. 1.

In the recording head as described above, liquid passages 6-2 and the liquid chamber 6-1 are formed integrally with a resin cured film 3H, but the recording head of the present invention is not limited to such a structure, and it is also possible to use a structure in which liquid passages are formed separately from the liquid chamber. However, regardless of the structure employed, the recording head of the present invention is characterised in that at least a part of the resin portion forming the liquid passage is formed of the active energy ray-curing resin composition as described above.

The liquid jet recording head of the present invention comprises an active energy ray-curing resin composition as a constitutional member of the head, which composition has a very excellent sensitivity to an active energy ray and resolution as required for a pattern forming material, which are imparted primarily by the monomer (ii) having ethylenically unsaturated bonds, the epoxy resin (iii) and the polymerization initiator generating Lewis acid contained as essential components in said composition, and it has been rendered possible to obtain a liquid jet recording head excellent in dimensional precision with good yield by use of said resin composition.

Also, the active energy ray-curing resin composition to be used in the present invention utilizes effectively the characteristics of the linear polymer (i) and the epoxy resin (iii) as essential components, namely having, in addition to excellent adhesion to a substrate and mechanical strength imparted primarily by the linear polymer (i), excellent chemical resistance and dimensional stability imparted primarily by the epoxy resin (iii), whereby it has been also rendered possible to obtain a recording head having durability for a long term by use of said composition.

Further, when the linear polymer having curability is used, it is possible to obtain a liquid jet recording head which is particularly excellent in the above adhesiveness, mechanical strength or chemical resistance.

The present invention is described in more detail by referring to the following synthesis examples and examples.

SYNTHESIS EXAMPLE 1

Solution polymerization of methyl methacrylate, butylcarbamylethyl acrylate and butoxymethyl acrylamide (=80/10/10 molar ratio) in toluene gave a linear polymer compound having heat crosslinkability with a weight average molecular weight of $1.4 \times 10^5$ and a glass transition temperature of 75° C. (this is called LP-2).

By use of the LP-2, an active energy ray-curing resin composition having the following composition was prepared.

| | |
|---|---|
| LP-2 | 100 parts by weight |
| Epikote 1001*[4] | 60 parts by weight |
| Epicrone N-730*[5] | 40 parts by weight |
| Celloxide 2021 | 50 parts by weight |
| Triphenylsulfonium tetrafluoroborate | 12 parts by weight |
| Crystal Violet | 0.5 parts by weight |
| Methyl isobutyl ketone | 200 parts by weight |
| Toluene | 100 parts by weight |

*[4]bisphenol A type epoxy resin produced by Yuka-Shell Epoxy K.K.; epoxy equivalent, 450-500
*[5]phenol-novolac type epoxy resin produced by Dainippon Ink Kagaku Kogyo K.K.; epoxy equivalent, 170-190

The above resin composition (A) was applied on a polyethylene terephthalate film (Lumilar T type) with a thickness of 16 μm by a bar coater to a thickness of 75 μm after drying, followed by drying at 100° C. for 10 minutes, to prepare a film having an active energy ray-curing resin composition with the above composition of the dry film type, which was used in subsequent formation of the recording head of the present invention.

SYNTHESIS EXAMPLE 2

A copolymer was prepared by solution polymerization of methyl methacrylate, acrylic acid and 2-hydroxyethyl methacrylate (=70/10/20 molar ratio) in toluene. Then, glycidyl methacrylate was added in an amount equivalent to the carboxylic groups in the copolymer and the mixture was reacted at 80° C. with the use of triethylbenzylammonium chloride as a catalyst to obtain a linear polymer compound having photocrosslinkability with a weight average molecular weight of $1.1 \times 10^5$ and a glass transition temperature of 96° C. (this is called LP-3).

By use of the above LP-3, an active energy ray-curing resin composition was prepared as follows.

| | |
|---|---|
| LP-3 | 100 parts by weight |
| Epicrone*[6] | 60 parts by weight |
| Epikote 152*[7] | 60 parts by weight |
| Celloxide 2021 | 50 parts by weight |
| Diphenyliodonium tetrafluoroborate | 12 parts by weight |
| Crystal Violet | 0.5 parts by weight |
| Methyl isobutyl ketone | 200 parts by weight |
| Toluene | 100 parts by weight |

*[6]bisphenol F type epoxy resin produced by Dainippon Ink Kagaku Kogyo K.K.; epoxy equivalent 170-190
*[7]cresol-novolac type epoxy resin produced by Yuka-Shell Epoxy K.K.; epoxy equivalent 172-179

The composition was applied by a bar coater on a 16 μm thick polyethylene terephthalate film (Lumilar T type) to a thickness after drying of 75 μm. The coated layer was protected by pressure lamination of a 25 μm polyethylene film thereon to prepare a film having an active energy ray-curing resin composition with the above composition of the dry film type, which was used in subsequent formation of the recording head of the present invention.

EXAMPLE 1

By use of the dry film prepared in Synthesis example 1, following the steps of FIG. 1 to FIG. 6 as described previously in the specification, on-demand type liquid jet recording heads with 10 orifices (orifice dimension: 75 μm × 50 μm, pitch 0.125 mm) having a heat generating element [hafnium boride ($HfB_2$)] per orifice as a discharge energy generating element were manufactured as follows. Specimen recording heads of this shape were manufactured in number of 30.

First, a plurality of heat generating elements were arranged at the predetermined positions on a substrate of silicon and electrodes for applying recording signals were connected to them.

Next, an SiO$_2$ layer (thickness 1.0 μm) as a protective film was provided on the substrate surface having the heat generating elements arranged thereon, and the surface of the protective layer was cleaned and dried. Then, superposed on the protective layer, a film obtained in Synthetic example 1 was laminated by means of a hot roll type laminator (trade name: HRL-24, produced by Du Pont Co.) at a roll temperature of 80° C., at a speed of 1 m/min. and under the pressurizing condition of 1 Kg/cm$^2$. The procedure to this stage afforded the state that a polyethyleneterephthalate film was laminated on the layer of the active energy ray-curing resin composition laminated on the substrate.

Subsequently, on the dry film provided on the substrate surface, a photomask having the pattern corresponding to the shapes of liquid passages and liquid chamber was superposed and, after performing alignment so that the above element might be placed in the liquid passages finally formed, the dry film was exposed to light by use of a high pressure mercury lamp from the overhead position of the photomask for 50 seconds so that the luminance in the vicinity of 254 nm was 34 mW/cm$^2$ at the irradiated surface.

After exposure, the polyethyleneterephthalate film was peeled off from the layer of the active energy ray-curing composition (dry film), and the exposed dry film was developed with a mixture of 1,1,1-trichloroethane/butyl cellosolve (70/30 weight ratio) according to the spray system at 35° C. for 60 seconds, thus removing by dissolution the unpolymerized (uncured) portion of the film from the substrate, to form grooves which became finally liquid passages and a liquid chamber with the cured portion of the dry film remaining on the substrate.

After completion of development, the cured dry film on the substrate was heated at 80° C. for 10 minutes, subjected to post-exposure of 10 J/cm$^2$, and further heated at 150° C. for 60 minutes to cure sufficiently the resin component.

After having formed the grooves for liquid passages and a liquid chamber with the cured dry film, a flat plate of soda glass provided with thru-holes which was to become the covering over the groove formed was coated with an epoxy type resin adhesive to a thickness of 3 μm by spin coating, then preheated to effect B-staging and forced to adhere onto the cured dry film, followed by main curing of the adhesive to effect adhesion fixing, thus forming a bonded body.

Subsequently, on the downstream side of the liquid passage of the bonded body, namely at the position of 0.150 mm toward the downstream side from the position where the discharge energy generating elements were located, the bonded body was cut vertically relative to the liquid passages by means of a commercially available dicing saw (trade name: DAD 2H/6 model, produced by DISCO Co.) to form orifices for discharging a recording liquid.

Finally, the cut surface was washed and dried, further smoothed by polishing of the cut surface, and supplied with pipes for feeding a recording liquid at the thru-holes to complete the liquid jet recording head. Every one of the recording heads obtained was found to be excellent in dimensional precision and have liquid passages and a liquid chamber which faithfully reproduced the mask pattern. The orifice dimension was within 50±5 μm and a orifice pitch within 125±5 μm.

The recording heads thus prepared were tested for quality and durability for prolonged use.

First, with respect to the recording heads obtained, durability test was conducted by dipping in the recording liquids having the respective compositions shown below at 60° C. for 1000 hours (the environmental conditions comparable to prolonged use of a recording head).

Components for the recording liquids (1) H$_2$O/diethylene glycol/polyethylene glycol #200/1,3-dimethyl-2-imidazolidinone/C.I. Direct Blue 86*1/Emulgen 931*3/PVP K-30*4
(=62/15/15/5/3/0.1/0.1 weight parts)
pH=8.0

(2) H$_2$O/ethylene glycol/diethylene glycol/polyethylene glycol #300/N-methyl-2-pyrrolidone/C.I. Food Black 2*2/Emulgen 931*3
(=55/10/20/5/5/5/0.2 weight parts)
pH=9.0

(3) H$_2$O/diethylene glycol/glycerine/triethylene glycol monomethyl ether/C.I. Direct Blue 86*1/PVP K-30*4
(=72/5/5/15/3/0.1 weight parts)
pH=7.0

(4) H$_2$O/ethylene glycol/diethylene glycol/polyethylene glycol #300/polyethylene glycol #400/N-methyl-2-pyrrolidone/C.I. Food Black 2*2
(=65/10/10/5/5/2/3 weight parts)
pH=10.0

(Note) *1 to *2 are water-soluble dyes, and caustic soda was employed for adjustment of pH. *3 is a trade name for polyoxyethylenenonylphenyl ether produced by Kao Sekken K.K. and *4 is a trade name for polyvinylpyrrolidone produced by GAF Co. in U.S.A.

After the durability test, each head subjected to said test was inspected with respect to the bonded state between the substrate or covering and the dry film. As a result, no peel-off or damage could be observed in any of the recording heads, but good adhesiveness was exhibited.

Next, separately from the above test, the printing test was performed with respect to 10 recording heads obtained by use of the above recording liquids. Each head was mounted on a recording device, and a recording signal of 10$^8$ pulses was continuously applied to the recording head for 14 hours. For each recording head, with respect to the states, immediately after initiation of printing and after a lapse of 14 hours, substantially no lowering of performance in both the discharging performance of recording liquid and the printed state can be observed. Thus, the recording head was found to be excellent in durability.

EXAMPLE 2

By use of the dry film prepared in synthesis example 2, a dry film was laminated on a substrate while peeling off the polyethylene film laminated on said dry film and pattern exposure was effected by an exposure light source for semiconductor (PLA-501, produced by Canon K.K.) using a deep UV lamp with a luminance of 8 mW/cm$^2$ at the irradiated surface for 150 seconds. The dry film exposed was developed, after peel-off of the polyethyleneterephthalate film, with a mixture of 1,1,1-trichloroethane/ethanol (=70/30 weight ratio) according to the spray system at 35° C. for 60 seconds. Following otherwise the same procedure of Example 1, liquid jet recording heads were manufactured.

Further, for each of the recording heads prepared, durability test and printing test were conducted in the same manner as Example 1. After the durability test, for each of the heads tested, the state of bonding between the substrate or covering and the cured dry film was inspected. As a result, in all of the recording heads, no peel-off or damage was observed but good adhesiveness was exhibited.

Also, in the printing test, in any of the recording heads, with respect to the states immediately after initiation of printing and after a lapse of 14 hours, substantially no lowering of performance was recognized in both the discharging performance of recording liquid and the printed state. Thus, all recording heads were found to be excellent in durability.

EXAMPLE 3

By use of the LP-1, an active energy ray-curing resin composition was prepared as follows.

| | |
|---|---|
| LP-1 | 100 parts by weight |
| Epikote 1001*[1] | 25 parts by weight |
| Celloxide 2021*[2] | 25 parts by weight |
| Trimethylolpropane triacrylate | 50 parts by weight |
| Triphenylsulfonium tetrafluoroborate | 10 parts by weight |
| Irgacure 651 | 15 parts by weight |
| Crystal Violet | 1 parts by weight |
| Hydroquinone | 0.2 parts by weight |
| Methyl cellosolve acetate | 300 parts by weight |

*[1]bisphenol A type epoxy resin produced by Yuka-Shell Epoxy K.K; epoxy equivalent 450-500
*[2]alicyclic type epoxy resin produced by Dicel Kagaku K.K.; epoxy equivalent 128-145

Subsequently the above resin composition was applied on a 16 μm polyethyleneterephthalate film by a wire bar, followed by drying at 100° C. for 20 minutes to prepare dry film according to the present invention having a resin composition layer with a film thickness of 75 μm.

By use of the dry film thus prepared, following the steps of FIG. 1 to FIG. 6 as described previously in the specification, an on-demand type liquid jet recording head having an orifice having 10 orifices (orifice dimension: 75 μm×50 μm, pitch 0.125 mm) with heat generating elements [hafnium boride ($HfB_2$)]at the discharge energy generating element was prepared as follows. Specimen recording heads of this shape were manufactured in number of 30.

First, a plurality of heat generating elements were arranged at the predetermined positions on a substrate of silicon and electrodes for applying recording signals were connected to them.

Next, an $SiO_2$ layer (thickness 1.0 μm) as a protective film was provided on the substrate surface having the heat generating elements arranged thereon, and the surface of the protective layer was cleaned and dried. Then, the dry film with a thickness of 75 μm as shown in the above synthesis example 2 heated to 80° C. was laminated on the protective layer at a speed of 0.4 f/min. under the pressurizing condition of 1 Kg/cm².

Subsequently, on the dry film provided on the substrate surface, a photomask having the pattern corresponding to the shapes of liquid passages and a liquid chamber was superposed and, after performing alignment so that the above element might be provided in the liquid passages to be finally formed, the dry film was exposed to UV-ray with an intensity of 12 mW/cm² from the overhead position of the photomask for 30 seconds.

Next, the dry film exposed was developed by dipping in 1,1,1-trichloroethane to remove by dissolution the unpolymerized (uncured) portion of the dry film from the substrate, thereby forming grooves which would become finally liquid passages and a liquid chamber with the cured dry film remaining on the substrate.

After completion of development, the cured dry film on the substrate was heated at 150° C. for one hour, followed further by irradiation with UV-ray with an intensity of 50 mW/cm² for 2 minutes to further cure the film.

After having formed the grooves for liquid passages and a liquid chamber with the cured dry film, a flat plate of soda glass provided with thru-holes which was to become the covering over the grooves formed was coated with an epoxy type resin adhesive to a thickness of 3 μm by spin coating, then preheated to effect B-staging and forced to adhered onto the cured dry film, followed further by main curing of the adhesive to effect adhesion fixing, thus forming a bonded body.

Subsequently, on the downstream side of the liquid passages of the bonded body, namely at the position of 0.150 mm toward the downstream side from the position where the discharge energy generating elements were located, the bonded body was cut vertically relative to the liquid passage by means of a commercially available dicing saw (trade name: DAD 2H/6 model, produced by DISCO Co.) to form orifices for discharging a recording liquid.

Finally, the cut surface were washed and dried, further smoothed by polishing of the cut surface, and provided with pipes for feeding the recording liquid at the thru-holes to complete a liquid jet recording head. Every one of the recording heads obtained was found to be excellent in dimensional precision and have liquid passages and a liquid chamber which have faithfully reproduced the mask pattern. The orifice dimensions were within 50±5 μm and the orifice pitches within 125±5 μm.

The recording heads thus prepared were tested for quality and durability for prolonged use.

First, for the recording heads obtained, durability test was conducted by dipping them in the recording liquids having the respective compositions shown below at 60° C. for 1000 hours (the environmental conditions comparable to prolonged use of a recording head).

Components for the recording liquids (1) $H_2O$/ethylene glycol/diethylene glycol/polyethylene glycol #400/propylene glycol/C.I. Direct Black 154*[1]/Emulgen 931*[4]
 (=63/10/5/5/10/7/0.1 weight parts)
 pH=8.0
(2) $H_2O$/triethylene glycol/polyethylene glycol #200/polyethylene glycol #400/C.I. Direct Black 154/Emulgen 931
 (=67/15/5/8/5/0.1 weight parts)
 pH=9.0
(3) $H_2O$/diethylene glycol/polyethylene glycol #200/N-methyl-2-pyrrolidone/C.I. Direct Yellow 86*[2]/Emulgen 931
 (=66/15/5/10/4/0.1 weight parts)
 pH=7.0
(4) $H_2O$/polyethylene glycol #300/C.I. Food Black 2*[3]/PVP K-30*[5]
 (=80/17/3/0.1 weight parts)
 pH=10.0
(Note) *1 to *3 are water-soluble dyes, *4 is a polyoxyethylene nonyl phenyl ether produced by Kao Sekken K.K. and *5 is a polyvinylpyrrolidone produced by GAF, U.S.A.; and caustic soda was employed for adjustment of pH.

For each recording liquid, 5 recording heads were used for durability test.

After the durability test, each head subjected to said test was inspected about the bonded state between substrate or covering and the dry film. As a result, no peel-off or damage could be observed in any of the recording heads, but good adhesiveness was exhibited.

Next, separately from the above test, for 10 recording heads obtained, the printing test was performed by use of the above recording liquid. Each head was mounted on a recording device, and a recording signal of $10^8$ pulses was continuously applied on the recording head for 14 hours. For each recording head, immediately after initiation of printing and after a lapse of 14 hours, substantially no lowering of performance in both the discharging performance of the recording liquid and the printed state could be observed. Thus, the recording head was found to be excellent in durability.

COMPARATIVE EXAMPLE

Recording heads were prepared in the same manner as Example 1 except for using a commercially available dry film Vacrel with a thickness of 75 μm (trade name of dry film solder mask, produced by Du Pont de Nemours Co.) and a commercially available dry film Photec SR-3000 with a film thickness of 50 μm (trade name, produced by Hitachi Kasei Kogyo K.K.).

For these recording heads, the same durability test as Example 1 was performed.

In the course of durability test, when employing Vacrel as the dry film, peel-off was observed after 100 hours with the recording liquids (2) and (4). Also, after 300 hours, peel-off was recognized with the liquids for recording (1) and (3).

On the other hand, when employing Photec SR-3000 as the dry film, peel-off was recognized after 300 hours with respective recording liquids of (1) to (4).

What we claim is:

1. A liquid jet recording head having a liquid passage communicated to a liquid discharging outlet provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:
   (i) a linear polymer having a glass transition temperature of 50° C. or higher and a weight average molecular weight of about $3.0 \times 10^4$ or higher;
   (ii) a monomer having an ethylenically unsaturated bond;
   (iii) an epoxy resin comprising at least one compound having one or more epoxy groups in the molecule; and
   (iv) a polymerization initiator capable of generating a Lewis acid by irradiation with an active energy ray.

2. A liquid jet recording head according to claim 1, wherein the contents of said linear polymer (i), said monomer (ii) and said resin (iii) are such that $L/(L+M+E)$ is within the range from 0.2 to 0.8 and $E/(E+M)$ is within the range from 0.3 to 0.7, provided that the content of the linear polymer (i) is defined as L parts by weight, that of the monomer (ii) as M parts by weight and that of the resin (iii) as E parts by weight, and said polymerization initiator (iv) is contained in an amount within the range from 0.2 to 15 parts by weight per 100 parts by weight of $(L+M+E)$.

3. A liquid jet recording head according to claim 1, wherein said polymerization initiator (iv) is an aromatic halonium salt compound or an aromatic onium salt compound having photosensitivity containing an element belonging to the group VIa or the group Va.

4. A liquid jet recording head according to claim 1, wherein said resin composition comprises 0.1 to 20 parts by weight of a radical polymerization initiator which can be activated with an active energy ray per 100 parts by weight of the total amount of said linear polymer (i), said monomer (ii) and said resin (iii).

5. A liquid jet recording head, having a liquid passage communicated to a liquid discharging outlet provided on a substrate surface, said passage being formed by subjecting a layer of a resin composition curable with an active energy ray to a predetermined pattern exposure with the use of said active energy ray to thereby form a cured region of said resin composition and removing the uncured region from said layer, said resin composition comprising:
   (i) a linear polymer having a glass transition temperature of 50° C. or higher and a weight average molecular weight of about $3.0 \times 10^4$ or higher;
   (iii) an epoxy resin comprising at least one compound having one or more epoxy groups in the molecule; and
   (iv) a polymerization initiator capable of generating a Lewis acid by irradiation with an active energy ray.

6. A liquid jet recording head according to claim 5, wherein the contents of said linear polymer (i) and said resin (iii) are such that $L/(L+E)$ is within the range from 0.2 to 0.8, provided that the content of the linear polymer (i) is defined as L parts by weight and that of the resin (iii) as E parts by weight, and said polymerization initiator (iv) is contained in an amount within the range from 0.2 to 15 parts by weight per 100 parts by weight of $(L+E)$.

7. A liquid jet recording head according to claim 5, wherein said polymerization initiator (iv) is an aromatic halonium salt compound or an aromatic onium salt compound having photosensitivity containing an element belonging to the group VIa or the group Va.

* * * * *

UNITED STATES PATENT AND TRADEMARK OFFICE
CERTIFICATE OF CORRECTION

PATENT NO. : 4,688,053          Page 1 of 4
DATED : August 18, 1987
INVENTOR(S) : HIROMICHI NOGUCHI, ET AL.

It is certified that error appears in the above-identified patent and that said Letters Patent is hereby corrected as shown below:

COLUMN 1

Line 56, "43876/1972)." should read --43876/1982).--

COLUMN 4

Line 58, "god" should read --good--.

COLUMN 5

Line 35, delete "of".

COLUMN 6

Line 1, "(4-pipenilinoethyl)" should read --(4-piperidinoethyl)--.

COLUMN 7

Line 32, delete "of".

COLUMN 8

Line 26, "0n" should read --On--.

COLUMN 9

Line 53, "on" should read --one--.
    Line 54, "bonds" should read --bond--.

UNITED STATES PATENT AND TRADEMARK OFFICE
CERTIFICATE OF CORRECTION

PATENT NO. : 4,688,053

DATED : August 18, 1987

INVENTOR(S) : HIROMICHI NOGUCHI, ET AL.

It is certified that error appears in the above-identified patent and that said Letters Patent is hereby corrected as shown below:

COLUMN 10

Line 1, "C;hd 1-$C_{12}$" should read --$C_1$-$C_{12}$--.
Line 3, "acrylate propyl" should read --acrylate, propyl--.
Line 16, "caploractone-modified" should read --caprolactone-modified--.

COLUMN 11

Line 52, "polynydric" should read --polyhydric--.

COLUMN 12

Line 48, "$[(R^6)a(R^7)b(R^8)c\ X]d^+[MQe]^{-(e-f)}$" should read
--$[(R^6)a(R^7)b(R^8)c\ X]d^+[MQe]^{-(e-f)}$--.
Line 49, "$r^6$" should read --$R^6$--.

COLUMN 13

Line 8, "$[(R^9)_q(R^{10})_h X]_i\ ^+[MQ_j]^{-(k-t)}$" should read
--$[(R^9)_g(R^{10})_h X]_i\ ^+[MQ_j]^{-(k-t)}$--.

COLUMN 14

Line 45, "VA" should read --Va--.

UNITED STATES PATENT AND TRADEMARK OFFICE
CERTIFICATE OF CORRECTION

PATENT NO. : 4,688,053                  Page 3 of 4

DATED : August 18, 1987

INVENTOR(S) : HIROMICHI NOGUCHI, ET AL.

It is certified that error appears in the above-identified patent and that said Letters Patent is hereby corrected as shown below:

COLUMN 18

Line 25, "promotors," should read --promoters,--.
    Line 38, "promotor," should read --promoter,--.

COLUMN 20

Line 30, "flatplate" should read --flat plate--.
    Line 36, "in vention" should read --invention--.

COLUMN 23

Line 6, "Synthetic" should read --Synthesis--.
    Line 66, "a" should read --the--.

COLUMN 24

Line 45, "states," should read --states--.
    Line 53, "synthesis" should read --Synthesis--.

COLUMN 25

Line 23, "Irgacure 651" should read --Irugacure 651--.
    Line 33, "prepare dry" should read --prepare a dry--.
    Line 41, "(HfB$_2$)]at" should read --(HfB$_2$)] as--.
    Line 54, "synthesis" should read --Synthesis--.

UNITED STATES PATENT AND TRADEMARK OFFICE
CERTIFICATE OF CORRECTION

PATENT NO. : 4,688,053

DATED : August 18, 1987

INVENTOR(S) : HIROMICHI NOGUCHI, ET AL.

It is certified that error appears in the above-identified patent and that said Letters Patent is hereby corrected as shown below:

COLUMN 26

Line 15, "adhered" should read --adhere--.
Line 28, "were" should read --was--.
Line 49, "Emulgen 931*4" should read --Emulgen 931*4--.

Signed and Sealed this

Twenty-third Day of February, 1988

Attest:

DONALD J. QUIGG

Attesting Officer

Commissioner of Patents and Trademarks